(12) United States Patent
Critchley

(10) Patent No.: US 10,782,047 B2
(45) Date of Patent: Sep. 22, 2020

(54) FRONT GRILLE MOUNTING TO A MOTOR VEHICLE HOOD ASSEMBLY

(71) Applicant: VOLVO TRUCK CORPORATION, Gothenburg (SE)

(72) Inventor: David Critchley, Oak Ridge, NC (US)

(73) Assignee: Volvo Truck Corporation, Gothenburg (SE)

( * ) Notice: Subject to any disclaimer, the term of this patent is extended or adjusted under 35 U.S.C. 154(b) by 304 days.

(21) Appl. No.: 15/953,955

(22) Filed: Apr. 16, 2018

(65) Prior Publication Data

US 2019/0316806 A1 Oct. 17, 2019

(51) Int. Cl.
*F24F 13/08* (2006.01)
*B62D 25/12* (2006.01)

(52) U.S. Cl.
CPC ............ *F24F 13/084* (2013.01); *B62D 25/12* (2013.01)

(58) Field of Classification Search
CPC ............................... F24F 13/084; B62D 25/12
USPC ......................................... 296/193.1, 193.11
See application file for complete search history.

(56) References Cited

U.S. PATENT DOCUMENTS

| 7,152,915 | B2 * | 12/2006 | Diehl | ...................... B60R 19/52 296/193.1 |
| 2005/0161979 | A1 * | 7/2005 | Chernoff | .............. B62D 25/105 296/191 |
| 2007/0176441 | A1 * | 8/2007 | Lau | ......................... B60R 19/52 293/115 |
| 2012/0080255 | A1 | 4/2012 | Elhardt et al. | |

\* cited by examiner

*Primary Examiner* — Joseph D. Pape
(74) *Attorney, Agent, or Firm* — Withrow & Terranova, PLLC

(57) ABSTRACT

Aspects of the disclosure relate to a front grille and a motor vehicle hood assembly, as well as methods of installing the front grille to the hood assembly. The front grille includes a peripheral frame with left and right members and a plurality of fasteners extending rearward from the left member and the right member. The hood assembly includes medially extending tab members and insertion gaps arranged proximate to left and right sides of a front aperture defined in the hood assembly. Each tab member is separated from each other tab member by at least one of the insertion gaps. During mounting, the plurality of fasteners of the front grille are inserted into the insertion gaps, and the front grille is slid upward relative to the hood assembly, causing the fasteners to slidably engage the tab members. Sliding engagement of the fasteners reduces stress on the front grille from hood deflection.

21 Claims, 10 Drawing Sheets

FRONT GRILLE MOUNTING TO A MOTOR VEHICLE HOOD ASSEMBLY

FIELD OF THE DISCLOSURE

The disclosure relates generally to mounting of a front grille to a motor vehicle hood assembly. In particular aspects, the disclosure relates to a front grille and a motor vehicle hood assembly that are configured to slidably engage one another, as may be desirable to facilitate installation and reduce stress on the front grille attributable to hood deflection.

BACKGROUND

Motor vehicles, such as trucks, often include a front grille covering an opening in a front hood assembly of the motor vehicle. This opening in the front hood assembly allows air to enter and flow past one or more heat exchangers (e.g., a radiator) of the motor vehicle for cooling purposes. The front grille typically covers the opening to protect the engine and other automotive components located under the front hood assembly, while still allowing air to enter the front hood assembly. In some motor vehicles, the front grille may additionally or solely serve a decorative purpose.

Traditionally, peripheral portions of a front grille are fixedly or rigidly mounted to the front hood assembly. For example, top, bottom, left, and right sides of a generally rectangular front grille may be fixedly mounted to the front hood assembly of a motor vehicle by screws or other fasteners.

During rough driving, a vehicle hood assembly may deflect or deform, with such deflection being especially pronounced in the case of tall motor vehicles (e.g., trucks). For example, an upper surface of a hood assembly may sway laterally from side to side relative to a bottom portion of the hood assembly, thereby causing a generally rectangular front opening of a front grille to resemble a parallelogram. This lateral movement may put substantial stress on the front grille, and potentially damage it.

Although bushings or other elastic material elements may be intermediately arranged between a hood assembly and a front grille to accommodate a degree of deformation, such items are cumbersome to install, are subject to deterioration with time, and may impair the aesthetic character of a front grille.

Accordingly, the art continues to seek improvement in structures and methods facilitating mounting a front grille to a hood assembly of a motor vehicle that overcomes challenges associated with conventional structures and methods.

SUMMARY

Aspects of the disclosure relate to a front grille and to a motor vehicle hood assembly, as well as methods of installing a front grille to a hood assembly. An exemplary front grille includes a peripheral frame with left and right members and a plurality of fasteners extending rearward from the left member and the right member. An exemplary hood assembly (which may also be referred to herein simply as a "hood") may encompass structural members including a left fender portion, a right fender portion, and a hood portion. The structural members define a front aperture bounded by left and right sides. Such a hood assembly also includes medially extending tab members and insertion gaps arranged proximate to the left and right sides of the front aperture. Each medially extending tab member is separated from each other medially extending tab member by at least one insertion gap. In an exemplary method for mounting the front grille to the hood assembly, the plurality of fasteners of the front grille is inserted into the insertion gaps, and the front grille is slid upward relative to the hood assembly to position the front grille to cover the front aperture, thereby causing the plurality of fasteners to slidably engage the medially extending tab members. Accordingly, the front grille is mounted and slidably engaged to the hood assembly of the motor vehicle, where the sliding engagement of the plurality of fasteners of the front grille with the hood assembly tends to reduce stress on the front grille attributable to hood deflection.

In one aspect, a front grille for a motor vehicle comprises a peripheral frame, a first plurality of fasteners, and a second plurality of fasteners. The peripheral frame includes left and right members, and defines a central opening. The first plurality of fasteners extends rearward from the left member, and the second plurality of fasteners extends rearward from the right member. The first plurality of fasteners and the second plurality of fasteners are configured for sliding engagement with a hood assembly of the motor vehicle.

In certain embodiments, the front grille further comprises a grating disposed in the central opening extending between the left and right members of the peripheral frame.

In certain embodiments, the peripheral frame further comprises a top member and a bottom member. Each of the top member and bottom member extend between the left and right members. The left, right, top, and bottom members form a generally rectangular shape.

In certain embodiments, the front grille further comprises a plurality of upper attachment holes defined in the top member and a plurality of lower attachment holes defined in the bottom member.

In certain embodiments, each fastener of the first plurality of fasteners comprises a left mount extending rearward from the left member and a left engagement feature attached to and extending upward from a rear wall of the left mount, and each fastener of the second plurality of fasteners comprises a right mount extending rearward from the right member and a right engagement feature attached to and extending upward from a rear wall of the right mount.

In certain embodiments, each fastener of the first plurality of fasteners comprises a left slot defined between the left member and the left engagement feature, and each fastener of the second plurality of fasteners comprises a right slot defined between the right member and the right engagement feature. Each left slot and each right slot is configured to slidably receive a portion of the hood assembly of the motor vehicle therein.

In certain embodiments, each left engagement feature and each right engagement feature comprises a spring clip configured to exert a biasing force on a portion of the hood assembly that serves to reduce forward-rearward separation between the front grille and the hood assembly of the motor vehicle.

In certain embodiments, the spring clip comprises a recurved shape that defines a forwardly extending engagement portion configured to contact the hood assembly of the motor vehicle.

In certain embodiments, each of the left mount and the right mount includes a top surface defining an opening configured to receive at least a portion of the spring clip to promote attachment of the spring clip to the respective mount.

In another aspect, a hood assembly for a motor vehicle comprises at least one structural member, a plurality of first medially extending tab members, a plurality of first insertion gaps, a plurality of second medially extending tab members, and a plurality of second insertion gaps. The at least one structural member defines a front aperture bounded by left and right sides. The plurality of first medially extending tab members and the plurality of first insertion gaps are each arranged proximate to the left side of the front aperture. Each first medially extending tab member of the plurality of first medially extending tab members is separated from each other first medially extending tab member by at least one first insertion gap of the plurality of first insertion gaps. The plurality of second medially extending tab members and the plurality of second insertion gaps are each arranged proximate to the right side of the front aperture. Each second medially extending tab member of the plurality of second medially extending tab members is separated from each other second medially extending tab member by at least one second insertion gap of the plurality of second insertion gaps. Each insertion gap of the plurality of first insertion gaps and the plurality of second insertion gaps is configured to receive a fastener extending rearwardly from a front grille during a grille mounting operation, with the front grille being arranged to cover the front aperture. Each medially extending tab member of the plurality of first medially extending tab members and the plurality of second medially extending tab members is configured to slidably engage the fastener extending rearwardly from the front grille.

In certain embodiments, the front aperture is further bounded by an upper side defined by the at least one structural member.

In certain embodiments, the hood assembly further comprises a plurality of upper attachment holes defined in the at least one structural member along the upper side to receive upper fasteners for mounting the front grille to the hood assembly.

In certain embodiments, the at least one structural member further comprises a lower opening extending between a bottom of the left side of the front aperture and a bottom of the right side of the front aperture.

In certain embodiments, the hood assembly further comprises a lateral support that is rearwardly offset relative to a front surface of the at least one structural member, wherein the lateral support is arranged behind the lower opening.

In certain embodiments, the lateral support comprises a plurality of mounting brackets configured to receive lower fasteners for mounting the front grille to the hood assembly.

In certain embodiments, the at least one structural member comprises a unitary structural member encompassing a left fender portion, a right fender portion, and a hood portion extending between and generally above the left fender portion and the right fender portion.

In certain embodiments, the front aperture extends between the left fender portion and the right fender portion, and extends below the hood portion.

In certain embodiments, each medially extending tab member of the pluralities of first and second medially extending tab members comprises a rearwardly protruding segment arranged proximate to a bottom edge of the medially extending tab member to promote retention of the fastener of the front grille.

In another aspect, a method for mounting a front grille to a motor vehicle hood assembly is disclosed herein. The motor vehicle hood assembly includes at least one structural member defining a front aperture bounded by left and right sides. The method comprises inserting a first plurality of fasteners extending rearward from a left member of a peripheral frame of the front grille with a plurality of first insertion gaps arranged proximate to the left side of the front aperture, and inserting a second plurality of fasteners extending rearward from a right member of the peripheral frame of the front grille with a plurality of second insertion gaps arranged proximate to the right side of the front aperture. The method further comprises sliding the front grille upward relative to the motor vehicle hood assembly to position the front grille to cover the front aperture, to cause the first plurality of fasteners to engage a first plurality of medially extending tab members arranged proximate to the left side of the front aperture, and to cause the second plurality of fasteners to engage a second plurality of medially extending tab members arranged proximate to the right side of the front aperture.

In certain embodiments, the method further comprises fastening a top member of the front grille to the at least one structural member proximate to an upper edge bounding the front aperture.

In certain embodiments, the method further comprises fastening a bottom member of the front grille to a lateral support associated with the at least one structural member, wherein the lateral support is rearwardly offset relative to a front surface of the at least one structural member.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawings.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1A:
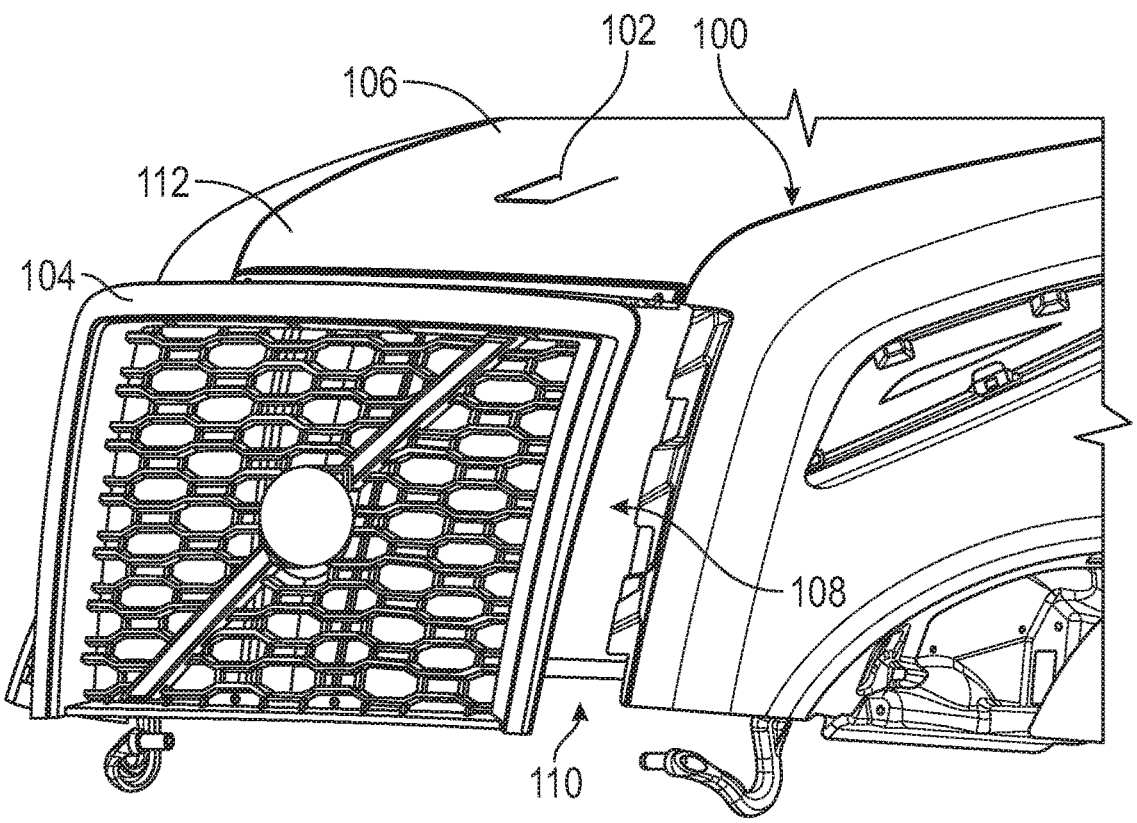
FIG. 1A is a partially exploded perspective view of a hood assembly and front grille of a motor vehicle, the hood assembly including structural members defining a front aperture, and the front grille configured to slidably engage the hood assembly to cover the front aperture.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The disclosure relates to a front grille and a motor vehicle hood, as well as methods of installing the front grille to the hood. In certain embodiments, a front grille for a motor vehicle comprises a peripheral frame, a first plurality of fasteners, and a second plurality of fasteners. The peripheral frame includes left, right, top, and bottom members, and defines a central opening. In certain embodiments, the left, right, top, and bottom members form a generally rectangular shape. In other embodiments, the peripheral frame forms a non-rectangular shape (e.g., trapezoidal). In certain embodiments, the front grille further comprises a plurality of upper attachment holes defined in the top member to attach the top member to the hood assembly and a plurality of lower attachment holes defined in the bottom member to attach the bottom member to the hood assembly. In certain embodiments, the front grille further comprises a grating disposed in the central opening extending between the left and right members of the peripheral frame for structural rigidity and to allow airflow therethrough.

The first plurality of fasteners extends rearward from the left member, and the second plurality of fasteners extends rearward from the right member. The fasteners are configured for sliding engagement with the hood assembly of the motor vehicle. In some embodiments, the fasteners are forwardly biased and frictionally engaged with the hood assembly to mount the left and right members to the hood assembly. In other embodiments, the fasteners are rigid and the hood assembly includes biasing elements to engage the fasteners.

In certain embodiments, each fastener comprises a mount extending rearward from a back surface of the front grille and an engagement feature attached to and extending upward from a rear wall of the mount. In certain embodiments, each fastener comprises a slot defined between a back surface of the peripheral frame and the engagement feature. Each slot is configured to slidably receive a portion of the hood assembly of the motor vehicle therein.

In certain embodiments, each engagement feature comprises a spring clip configured to exert a biasing force on a portion of the hood assembly that serves to reduce forward-rearward separation between the front grille and the hood assembly of the motor vehicle. In certain embodiments, the spring clip comprises a recurved shape that defines a forwardly extending engagement portion configured to contact the hood assembly of the motor vehicle. In certain embodiments, each mount includes a top surface defining an opening configured to receive at least a portion of the spring clip to promote attachment of the spring clip to the respective mount.

In certain embodiments, a hood assembly for a motor vehicle comprises at least one structural member, a plurality of first medially extending tab members, a plurality of first insertion gaps, a plurality of second medially extending tab members, and a plurality of second insertion gaps. In certain embodiments, the at least one structural member comprises a unitary structural member encompassing a left fender portion, a right fender portion, and a hood portion extending between and generally above the left fender portion and the right fender portion. In other embodiments, the left fender portion, right fender portion, and hood portion are non-unitary and are subject to relative movement and/or disassembly.

The at least one structural member defines a front aperture bounded by an upper side, a left side, and a right side. In certain embodiments, the front aperture extends between the left fender portion and the right fender portion, and extends below the hood portion. The front aperture provides airflow into an interior of the hood assembly, such as to cool one or more components of the engine (e.g., the engine radiator). In certain embodiments, the at least one structural member further comprises a lower opening extending between a bottom of the left side of the front aperture and a bottom of the right side of the front aperture.

In certain embodiments, the hood assembly comprises a plurality of upper attachment holes defined in the at least one structural member along the upper side to receive upper fasteners for mounting the front grille to the hood assembly. In certain embodiments, the hood assembly further comprises a lateral support that is rearwardly offset relative to a front surface of the at least one structural member, wherein the lateral support is arranged behind the lower opening. In certain embodiments, the lateral support comprises a plurality of mounting brackets configured to receive lower fasteners for mounting the front grille to the hood assembly. Thus, the lateral support provides structural rigidity to the left and right fender portions, provides clearance for initial insertion of the front grille into the front opening before translation of the front grille upward to slidably engage the hood assembly, and mountably receives a lower portion of the front grille.

The medially extending tab members and the insertion gaps are arranged proximate to the left and right sides of the front aperture. Each medially extending tab member is separated from each other medially extending tab member by at least one insertion gap of the insertion gaps. Each insertion gap is configured to receive a fastener extending rearwardly from a front grille during a grille mounting operation, with the front grille being arranged to cover the front aperture. Each medially extending tab member is configured to slidably engage the fastener extending rearwardly from the front grille. In certain embodiments, each medially extending tab member comprises a rearwardly protruding segment (e.g., tapered surface) arranged proximate to a bottom edge of the medially extending tab member to promote retention of the fastener of the front grille.

Accordingly, to mount the front grille to the hood assembly, the first plurality of fasteners of the front grille is inserted into the plurality of first insertion gaps of the front aperture of the hood assembly, and the second plurality of fasteners of the front grille is inserted into the plurality of second insertion gaps of the front aperture of the hood assembly. The lateral support is rearwardly offset relative to a front surface of the at least one structural member to provide clearance for insertion of the front grille into the hood assembly. The front grille is then slid upward relative to the motor vehicle hood assembly to position the front grille to cover the front aperture. This causes the first plurality of fasteners to engage the first plurality of medially extending tab members and causes the second plurality of fasteners to engage the second plurality of medially extending tab members. In certain embodiments, the top member of the front grille is fastened to the hood portion proximate to the upper edge bounding the front aperture. In certain embodiments, the bottom member of the front grille is fastened to the lateral support.

In certain embodiments, the top member of the front grille is rigidly attached to the hood assembly, the bottom member of the front grille is non-rigidly attached to the hood assembly (e.g., by isolators), and the left and right members of the front grille are slidably and frictionally engaged with the hood assembly by biased spring clips. Thus, the left, right, and bottom members of the front grille may move relative to the hood assembly (particularly the left and right members), such as during hood assembly deflection or deformation.

Details of illustrative embodiments are described hereinafter.

Figure 1B:
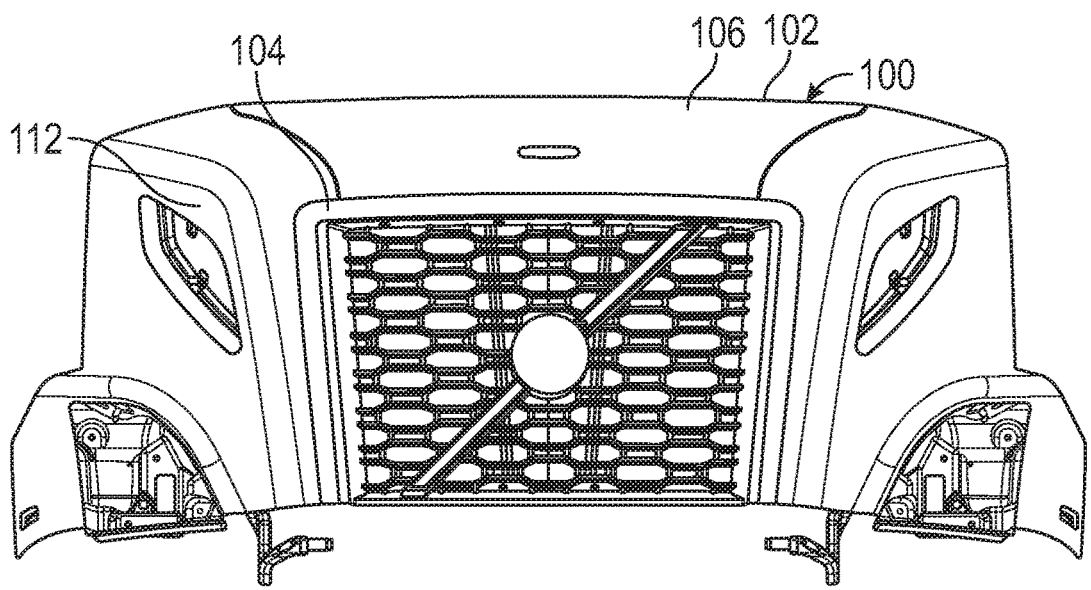
FIG. 1B is a front elevation view of the front grille of FIG. 1A mounted to the hood assembly of FIG. 1A.

FIGS. 1A and 1B illustrate a motor vehicle 100 including a hood assembly 102 and a front grille 104. In certain embodiments, the motor vehicle 100 comprises a truck, car, etc. The hood assembly 102 includes structural members 106 defining a front aperture 108 and a lower opening 110. In certain embodiments, the front aperture 108 allows air flow into an interior of the hood assembly 102, such as to cool an engine radiator. The front grille 104 is configured to mount to the hood assembly 102 to cover the front aperture 108 to protect the engine of the motor vehicle 100 while still allowing air flow through the front grille 104 and to the engine. As previously discussed, in some embodiments, the front grille 104 may additionally or solely serve a decorative purpose.

Referring to FIG. 1A, and as explained in more detail below, the front grille 104 (also referred to as a radiator grille) is mounted to the hood assembly 102 by positioning the front grille 104 over the front aperture 108 and moving the front grille 104 generally rearward until the front grille 104 contacts a front surface 112 of the hood assembly 102. The front grille 104 is then translated (e.g., slid) in a generally vertical direction such that lateral sides of the front grille 104 engage the hood assembly 102. Optionally, the top and/or bottom of the front grille 104 may then be fixedly mounted (e.g., mounted with one or more solid and/or elastomeric fasteners) to the hood assembly 102. Accordingly, at least portions of the front grille 104 slidably engage with the hood assembly 102 to mount the front grille 104 to the hood assembly 102, as shown in FIG. 1B. Once mounted, the lateral sides of the front grille 104 are frictionally engaged with the hood assembly 102, but the lateral sides are not fixedly engaged with the hood assembly 102. In this way, if the hood assembly 102 deflects or deforms (such as if a top of the hood assembly 102 laterally shifts relative to a bottom of the hood assembly 102) stress on the front grille 104 is reduced, thereby preventing any damage to the front grille 104.

FIGS. 2A-2D provide upper perspective and front elevation views, respectively, of the hood assembly 102. As discussed above, the hood assembly 102 includes structural members 106. The structural members 106 include a hood portion 200, a left fender portion 202A, a right fender portion 202B (opposite the left fender portion 202A), and a lateral support 204. The hood portion 200 extends between a top of the left fender portion 202A and a top of the right fender portion 202B. In certain embodiments, the hood portion 200 is movable relative to and separate from the left fender portion 202A and the right fender portion 202B. In other embodiments, the hood portion 200, left fender portion 202A, and right fender portion 202B are of a unitary construction and integrally connected to one another. The lateral support 204 extends between a bottom of the left fender portion 202A and a bottom of the right fender portion 202B. The lateral support 204 is offset from the front surface 112 of the hood assembly 102 towards a rear of the motor vehicle 100.

In certain embodiments, the front aperture 108 comprises a generally rectangular shape, where the front aperture 108 includes a top edge 206, a bottom edge 206B opposite the top edge 206, a left edge 208A, and a right edge 208B opposite the left edge 208A (each edge may also be referred to as a side). It is noted that the front aperture 108 could be any of a variety of shapes, such as trapezoidal, square, etc. The top edge 206 of the front aperture 108 is at least partially bounded by a front of the hood portion 200, the left edge 208A is at least partially bounded by a front of the left fender portion 202A, and the right edge 208B is at least partially bounded by a front of the right fender portion 202B. The bottom edge 206B is unbounded by the hood portion 200, the left fender portion 202A, or the right fender portion 202B, thereby forming the lower opening 110.

The front of the hood portion 200 includes (from left to right) first through fourth upper attachment holes 210-1 to 210-4, which are collectively referred to herein as upper attachment holes 210. The upper attachment holes 210 are horizontally positioned across a front edge of the hood portion 200 and are configured for attachment of the front grille 104 thereto. Further, the upper attachment holes 210 may be angularly positioned, relative to the front surface 112 of the left and right fender portions 202A, 202B to at least partially obscure or hide the fasteners positioned therethrough when the front grille 104 is mounted to the hood assembly 102.

The left fender portion 202A includes (from top to bottom) first through third left medially extending tab members 212A-1 to 212A-3, which are collectively referred to as left (or first) medially extending tab members 212A (also referred to as left medially extending flanges, etc.). The left fender portion 202A also includes (from top to bottom) first through third left insertion gaps 214A-1 to 214A-3, which are collectively referred to as left (or first) insertion gaps 214A. Each of the left medially extending tab members 212A is separated from each other left medially extending tab members 212A by the left insertion gaps 214A. More specifically, the positioning of the left medially extending tab members 212A and the left insertion gaps 214A are, from top to bottom, first left medially extending tab member 212A-1, first left insertion gap 214A-1, second left medially extending tab member 212A-2, second left insertion gap 214A-2, third left medially extending tab member 212A-3, and third left insertion gap 214A-3.

Similarly, the right fender portion 202B includes (from top to bottom) first through third right medially extending tab members 212B-1 to 212B-3, which are collectively referred to as right (or second) medially extending tab members 212B (also referred to as right medially extending flanges, etc.). The right fender portion 202B also includes (from top to bottom) first through third right insertion gaps 214B-1 to 214B-3, which are collectively referred to as right (or second) insertion gaps 214B. Each of the right medially extending tab members 212B are separated from one another by the right insertion gaps 214B. More specifically, the positioning of the right medially extending tab members 212B and the right insertion gaps 214B are, from top to bottom, first right medially extending tab member 212B-1, first right insertion gap 214B-1, second right medially extending tab member 212B-2, second right insertion gap 214B-2, third right medially extending tab member 212B-3, and third right insertion gap 214B-3.

The left insertion gaps 214A and the right insertion gaps 214B provide clearance for insertion of a portion of the front grille 104, and the left medially extending tab members 212A and the right medially extending tab members 212B slidably engage the front grille 104 (as explained below in more detail).

The left fender portion 202A also includes a left stiffening member 216A positioned proximate to the left edge 208A of the front aperture 108 and behind a front surface of the left fender portion 202A. Similarly, the right fender portion 202B also includes a right stiffening member 216B positioned proximate to the right edge 208B of the front aperture 108 and behind a front surface of the right fender portion 202B. The left and right stiffening members 216A, 216B provide structural rigidity to the hood assembly 102 and prevent deformation of the hood assembly 102 (e.g., prevent lateral movement of a top of the hood assembly 102 relative to a bottom thereof).

The lateral support 204 includes a left mounting bracket 218A disposed towards a left side of the lateral support 204 and a right mounting bracket 218B disposed towards a right side of the lateral support 204. The left mounting bracket 218A includes a lower attachment hole 220A to receive a left isolator 222A therein, and the right mounting bracket 218B includes a lower attachment hole 220B to receive a right isolator 222B therein. The left mounting bracket 218A, right mounting bracket 218B, left isolator 222A, and right isolator 222B attach to a bottom of the front grille 104, as explained in more detail below. The left and right isolators 222A, 222B (also referred to as isolating rubber spacers, etc.) provide a less rigid attachment point with respect to attachment of the front grille 104 to the hood assembly 102.

Figure 2A:
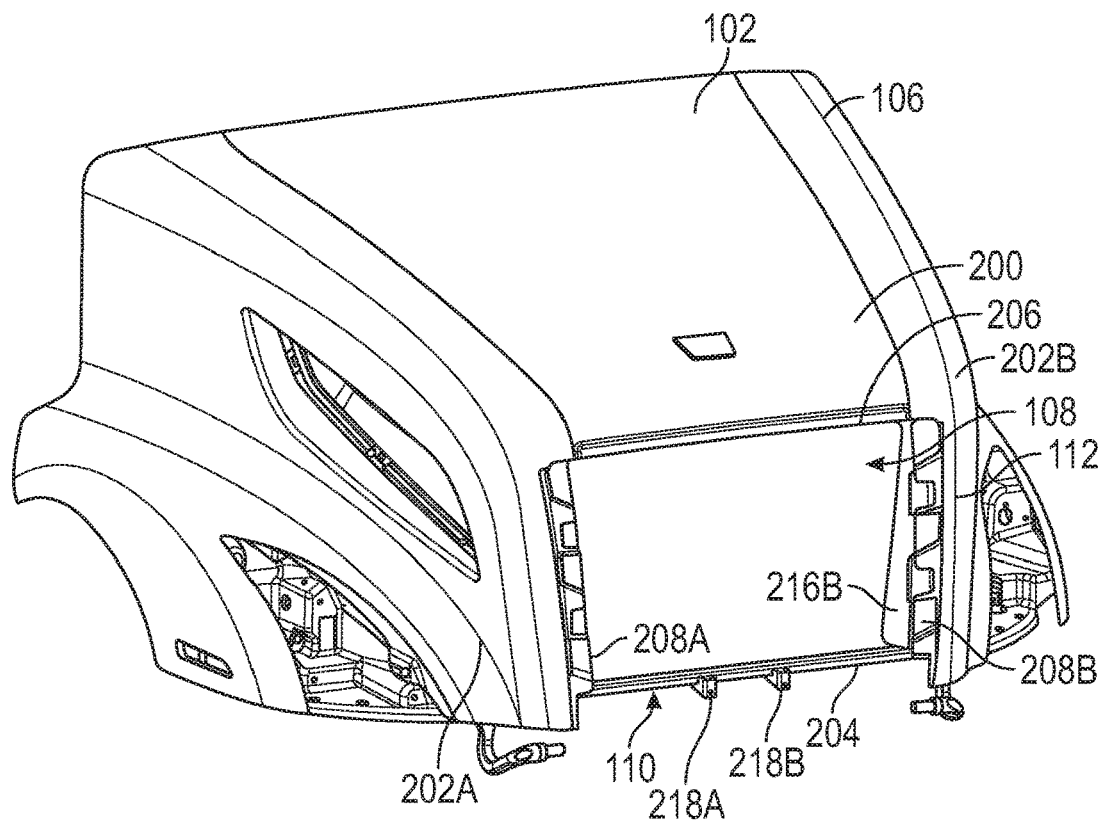
FIG. 2A is an upper perspective view of the hood assembly of FIG. 1A.
Figure 2B:
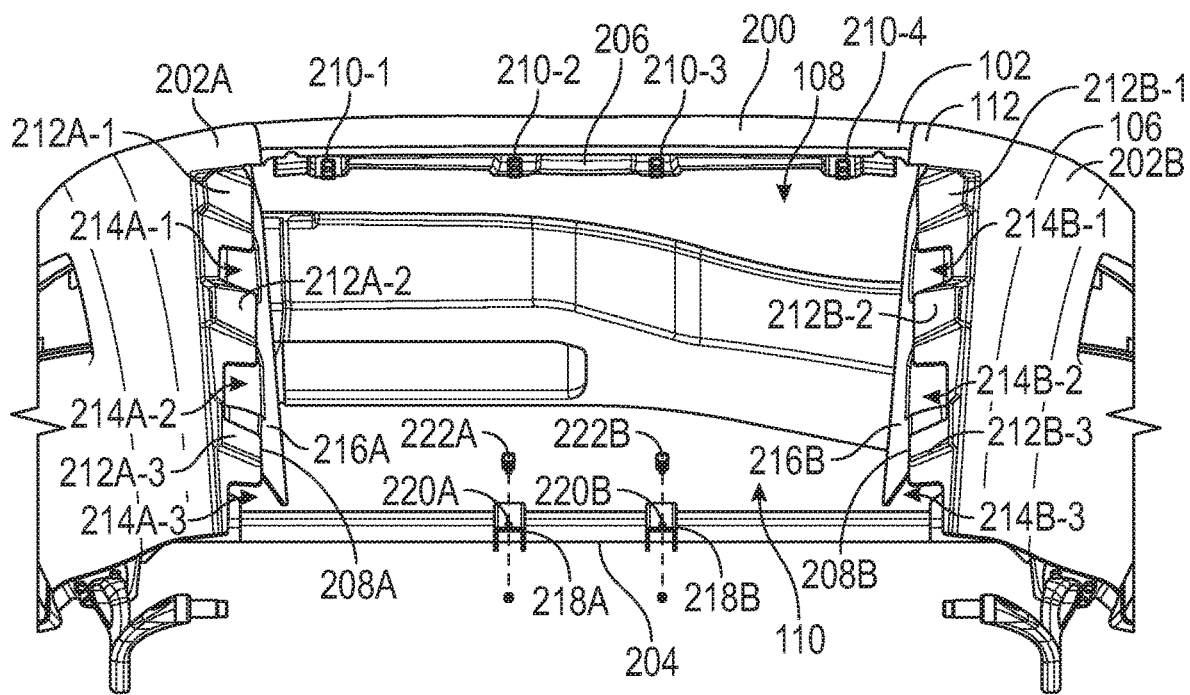
FIG. 2B is a front elevation view of the hood assembly of FIGS. 1A and 2A.
Figure 2C:
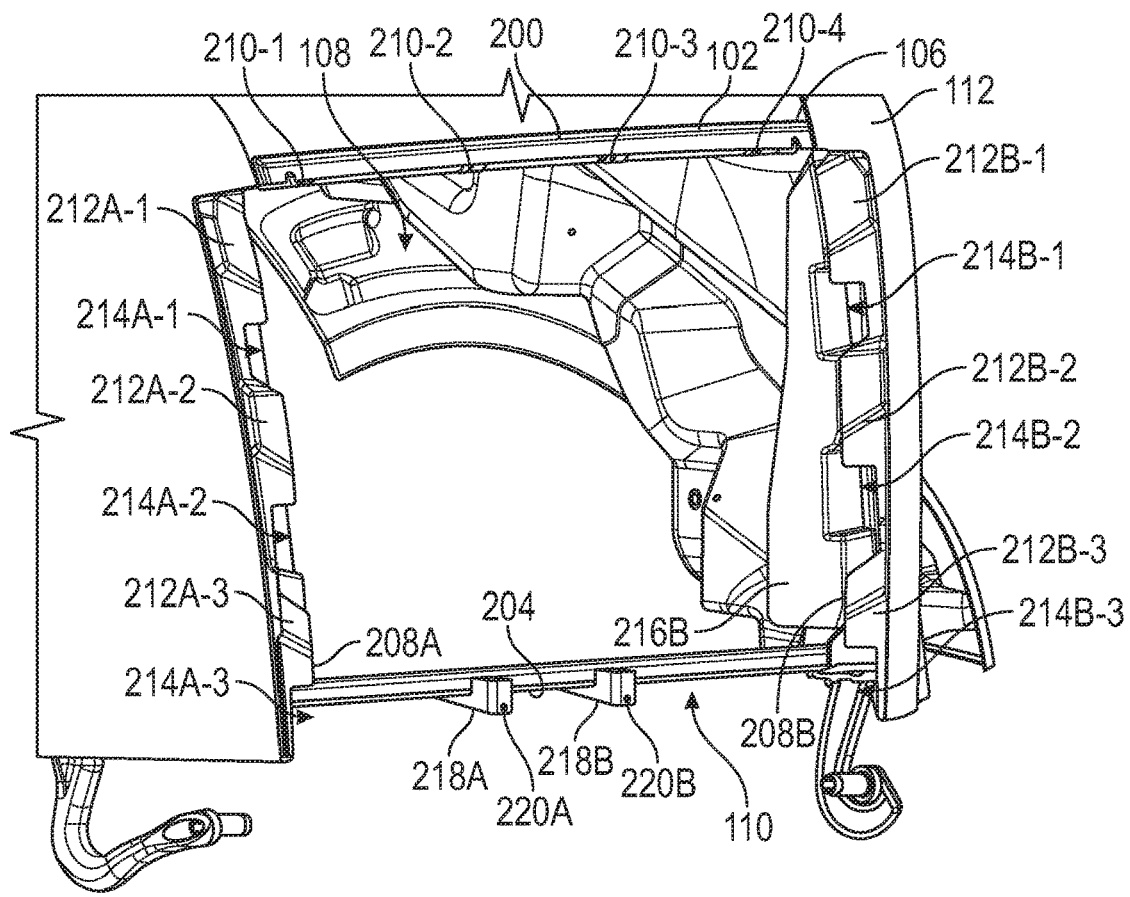
FIG. 2C is a magnified perspective view of the front aperture of the hood assembly of FIGS. 1A, 2A, and 2B.
Figure 2D:
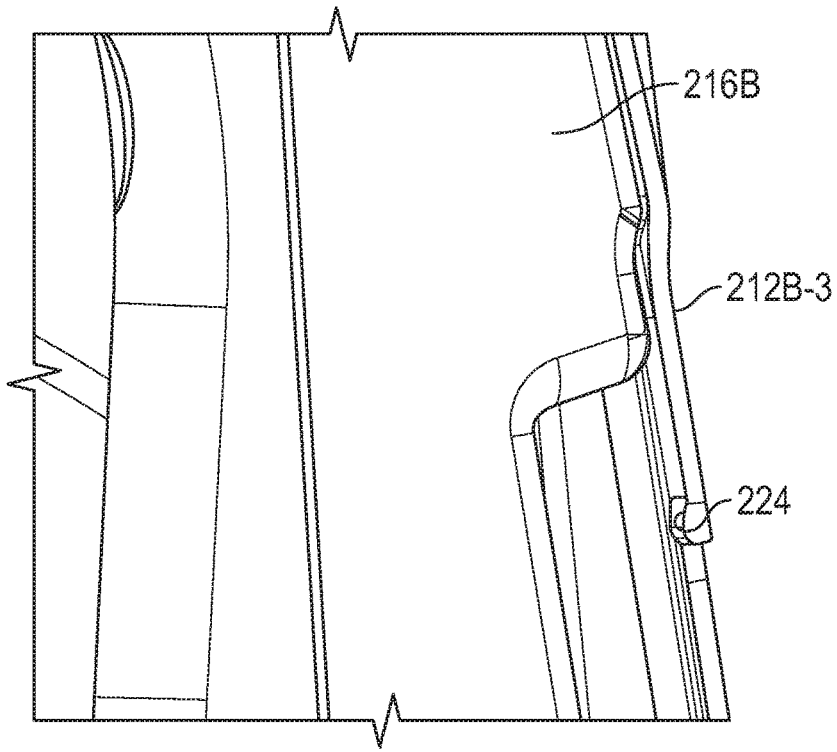
FIG. 2D is a side elevation view of a medially extending tab member of the hood assembly of FIGS. 1A, 2A, and 2B.

Referring to FIG. 2D, in certain embodiments, each of the left medially extending tab members 212A and the right medially extending tab members 212B include a rearwardly protruding segment 224 (also referred to as a raised area, detent, tapered surface, etc.) on an inner surface and towards a bottom edge of the left and right medially extending tab members 212A, 212B. As explained in more detail below, the rearwardly protruding segment 224 facilitates securement of the front grille 104 to the hood assembly 102. In certain embodiments, the rearwardly protruding segment 224 comprises a tapered surface.

Figure 3A:
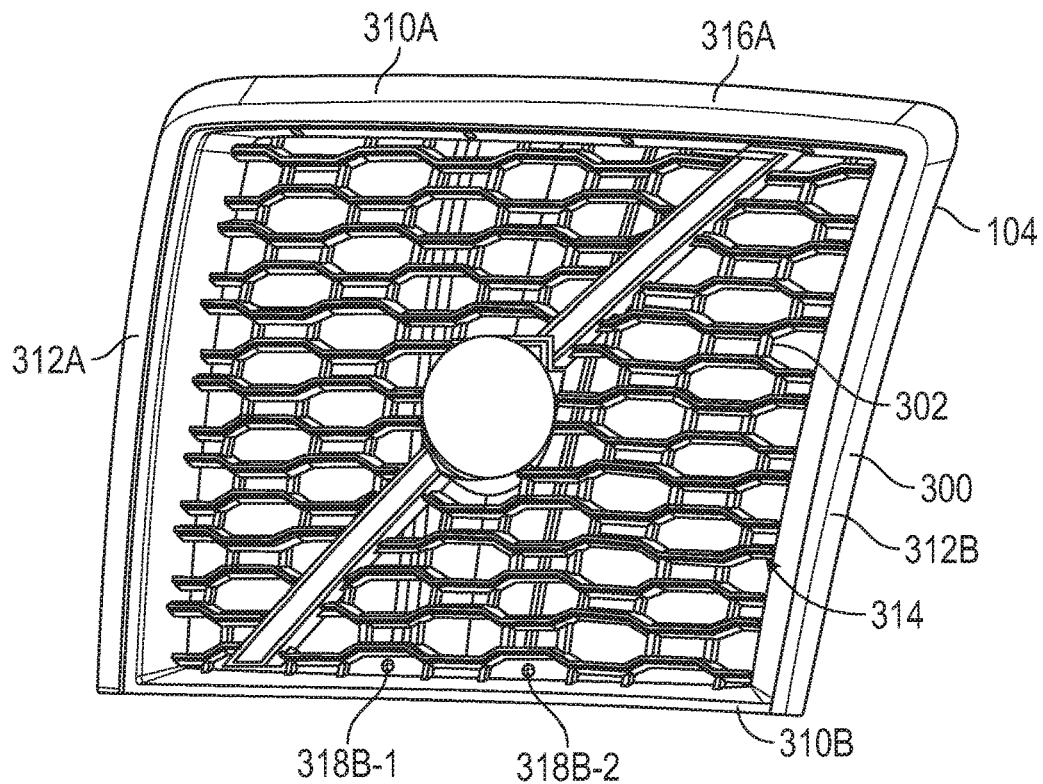
FIG. 3A is a front perspective view of the front grille of FIG. 1A.
Figure 3B:
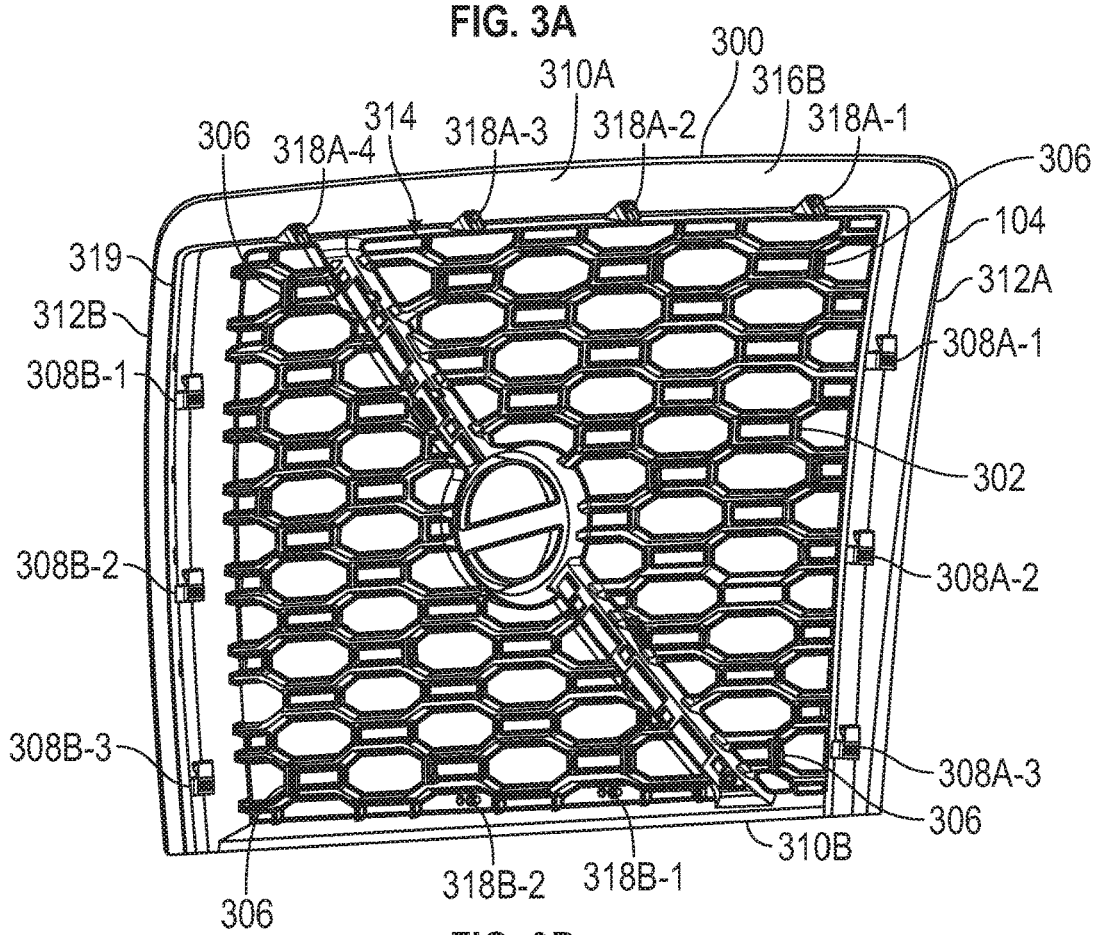
FIG. 3B is a rear perspective view of the front grille of FIGS. 1A and 3A.
Figure 3C:
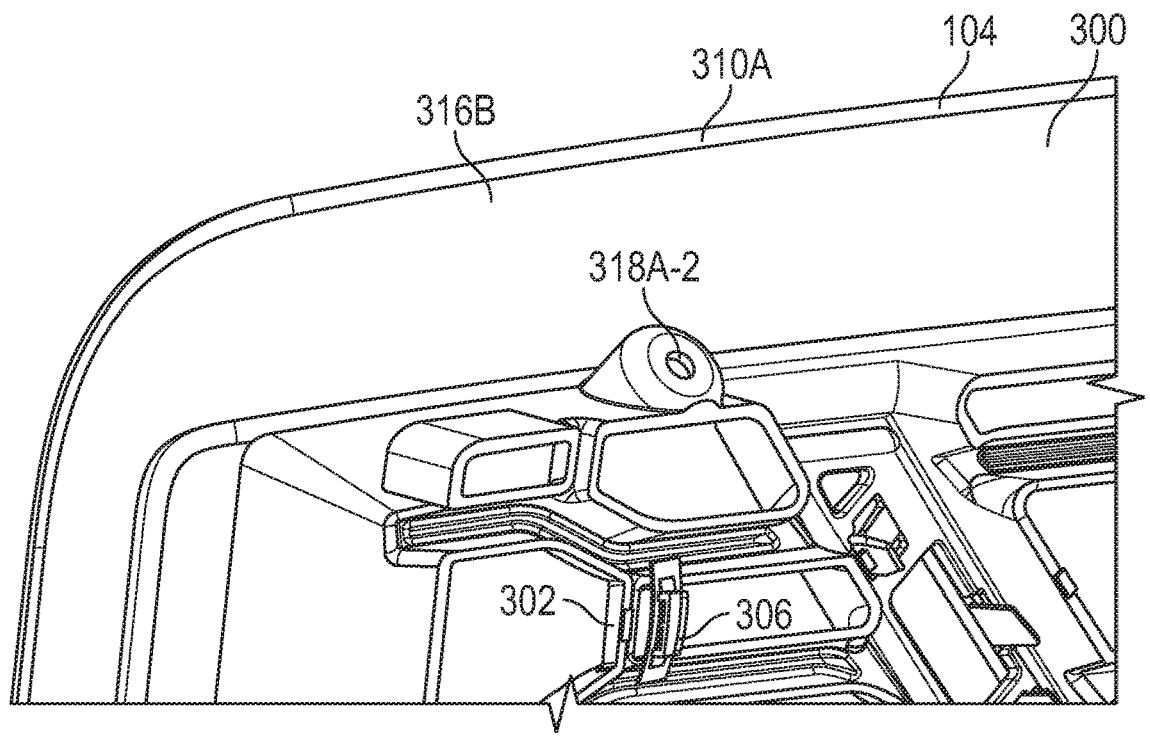
FIG. 3C is a magnified rear perspective view of an upper corner portion defining an upper attachment hole of the front grille of FIGS. 1A, 3A, and 3B.
Figure 3D:
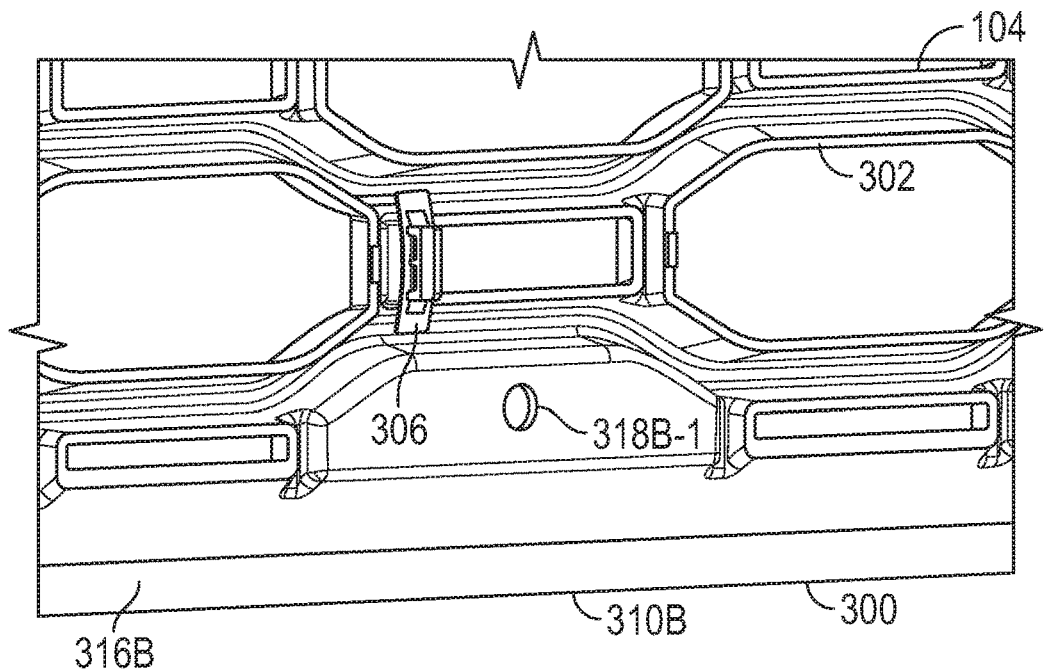
FIG. 3D is a magnified rear perspective view of a lower portion defining a lower attachment hole of the front grille of FIGS. 1A, 3A, and 3B.

FIGS. 3A and 3B provide perspective views of the entire front grille 104, and FIGS. 3C and 3D illustrate magnified portions thereof. The front grille 104 includes a peripheral frame 300, a grating 302 and screen (not shown) positioned within the peripheral frame 300, and fasteners 308A-1 to 308B-3 attached to the peripheral frame 300. In particular, the grating 302 includes a plurality of screen attachments 306, for attaching the screen (e.g., bug screen) to the grating 302. In this way, the grating 302 allows for airflow through the grating 302 and provides for structural rigidity of the front grille 104. Further, the screen provides for airflow but with smaller openings to thereby catch any potential debris and protect the engine and interior of the hood assembly 102.

In certain embodiments, the peripheral frame 300 is generally rectangularly shaped, where the peripheral frame 300 includes a horizontal top member 310A, a horizontal bottom member 310B opposite the top member 310A, a vertical left member 312A, and a vertical right member 312B opposite the left member 312A. The top member 310A, bottom member 310B, left member 312A, and right member 312B define a central opening 314, with the grating 302 positioned within the central opening 314.

Also, the peripheral frame 300 includes a front surface 316A and a back surface 316B opposite the front surface 316A. The peripheral frame 300 provides structural rigidity to the grating 302 and facilitates attachment of the front grille 104 to the hood assembly 102. In particular, the top member 310A of the peripheral frame 300 includes (from left to right) first through fourth upper attachment holes 318A-1 to 318A-4, which are collectively referred to as upper attachment holes 318A. The upper attachment holes 318A are through holes to receive a fastener therein, and which align with the upper attachment holes 210 of the hood assembly 102 to secure the top member 310A of the peripheral frame 300 with the hood portion 200 of the hood assembly 102. The upper attachment holes 318A may be angularly mounted relative to the front surface 316A of the peripheral frame 300 to align with the upper attachment holes 210 of the hood portion 200 in order to partially hide or obscure the fasteners positioned therethrough when the front grille 104 is attached to the hood portion 200 of the hood assembly 102.

The bottom member 310B of the peripheral frame 300 includes (from left to right) a first lower attachment hole 318B-1 and a second lower attachment hole 318B-2, which are collectively referred to as lower attachment holes 318B. The lower attachment holes 318B are through holes to receive a fastener therein, and which align with the left and right isolators 222A, 222B of the lateral support 204 of the hood assembly 102 to secure the bottom member 310B of the peripheral frame 300 with the lateral support 204 of the hood assembly 102. Further, the peripheral frame 300 may include a centering boss 319 on the back surface 316B of the left and right members 312A, 312B of the peripheral frame 300 to center the front grille 104 relative to the hood assembly 102 and thereby facilitate alignment of the upper attachment holes 318A and lower attachment holes 318B of the front grille 104 with upper attachment holes 210 and lower attachment holes 220A, 220B of the hood assembly 102. In particular, the centering boss 319 interacts with the left and right medially extending tab members 212A, 212B such that the centering boss 319 is positioned therebetween when the front grille 104 is mounted to the hood assembly 102.

The fasteners 308A-1 to 308B-3 are attached to the back surface 316B of the peripheral frame 300. In particular, the fasteners are attached to the back surface 316B of the left member 312A and the right member 312B. These include (from top to bottom), on the back surface 316B of the left member 312A, first through third left fasteners 308A-1 to 308A-3, which are referred to collectively as the left (or first) fasteners 308A. These also include (from top to bottom), on the back surface 316B of the right member 312B, first through third right fasteners 308B-1 to 308B-3, which are referred to collectively as the right (or second) fasteners 308B. The left fasteners 308A and the right fasteners 308B are collectively referred to herein as fasteners 308.

Figure 4A:
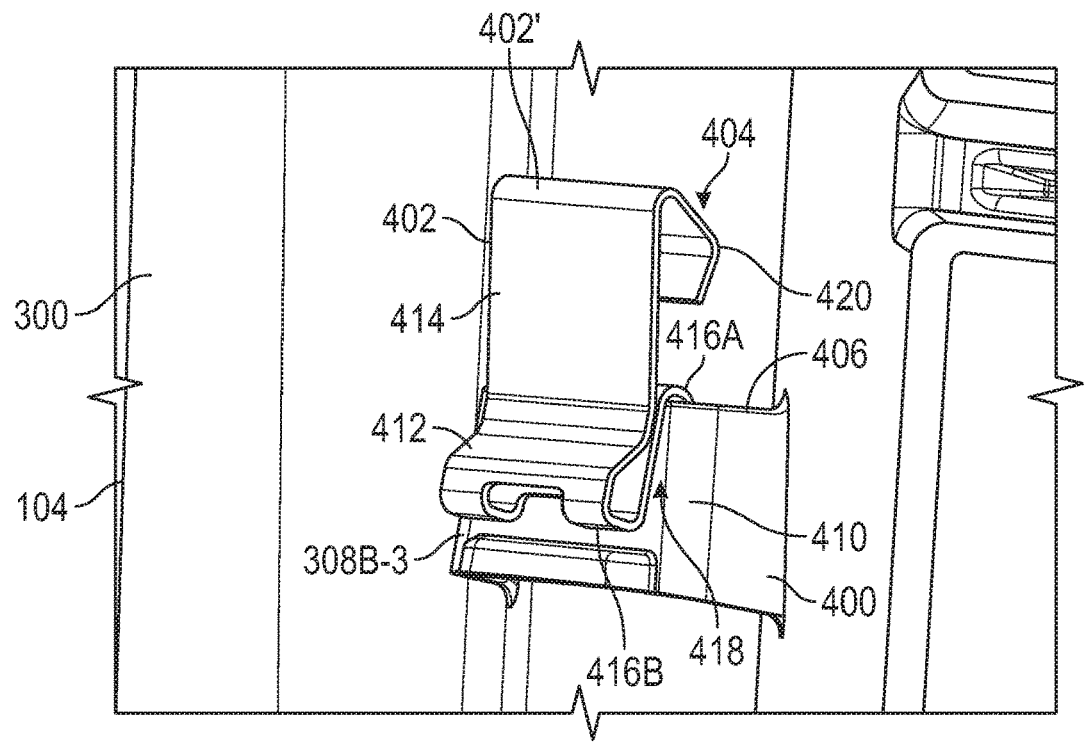
FIG. 4A is a perspective view of a fastener of the front grille of FIGS. 1A, 1B and 3A-3D, including a mount and an engagement feature attached to the fastener, and with the engagement feature embodied as a spring clip.
Figure 4B:
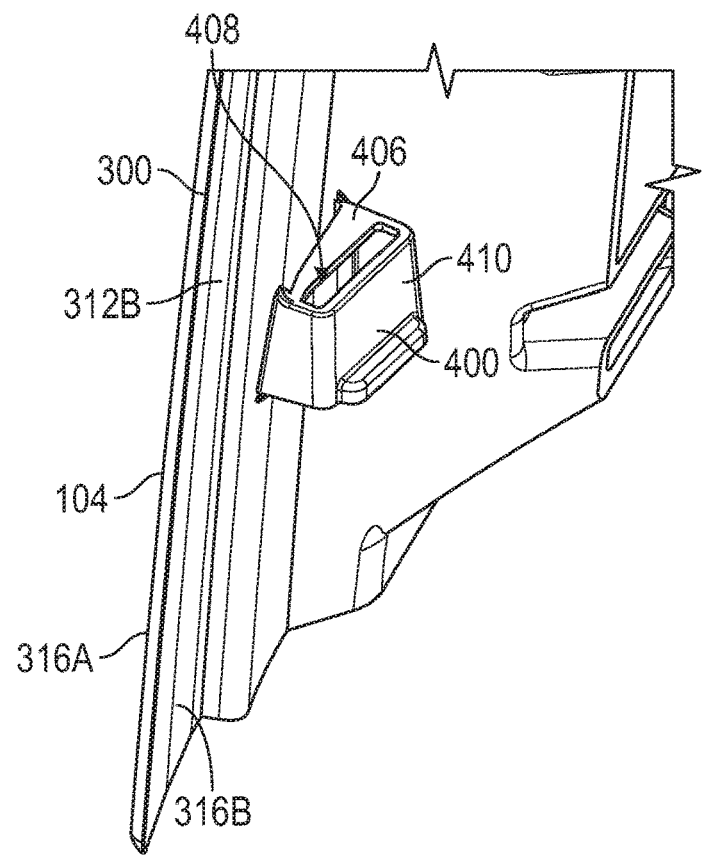
FIG. 4B is a perspective view of the mount of the fastener of FIG. 4A with the spring clip removed therefrom.

FIGS. 4A-4D illustrate the third right fastener 308B-3 of the front grille 104. Referring to FIGS. 4A and 4B, the third right fastener 308B-3 is shown and described, but the features shown and described apply to each of the fasteners 308. The third right fastener 308B-3 includes a mount 400 and an engagement feature 402 attached to the mount 400. An engagement slot 404 is defined between the back surface 316B of the peripheral frame 300 and the engagement feature 402 to receive at least a portion of a medially extending tab member 212A, 212B therein to attach the front grille 104 to the hood assembly 102. In particular, the left fasteners 308A include left mounts 400, left engagement features 402, and left engagement slots 404, and the right fasteners 308B include right mounts 400, right engagement features 402, and right engagement slots 404.

The mount 400 is attached to (e.g., integrally extending from) the back surface 316B of the peripheral frame 300. The mount 400 includes a top surface 406 with a top attachment slot 408 defined therein, and a back surface 410 proximate the top attachment slot 408 and generally perpendicular to the top surface 406. The top attachment slot 408 receives the engagement feature 402 therein and offsets the engagement feature 402 from the back surface 316B of the peripheral frame 300 to define the engagement slot 404. In this way, the engagement feature 402 extends upward from the top surface 406 of the mount 400.

Figure 4C:
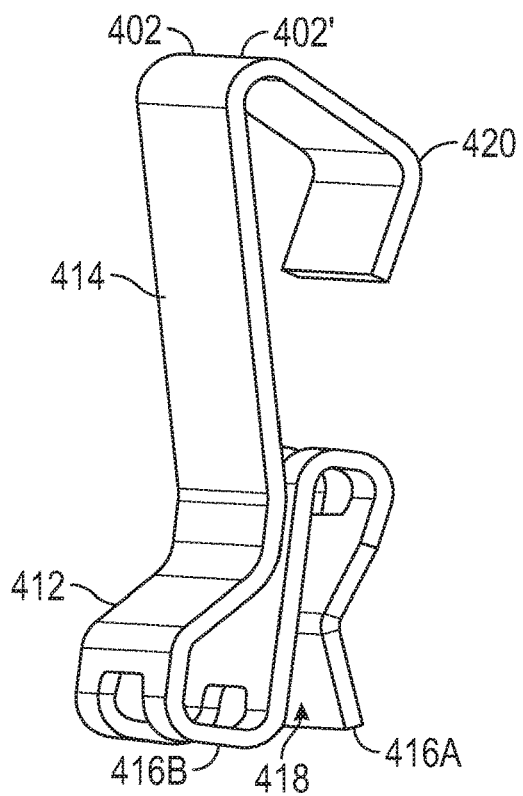
FIG. 4C is a perspective view of the spring clip of FIG. 4A.
Figure 4D:
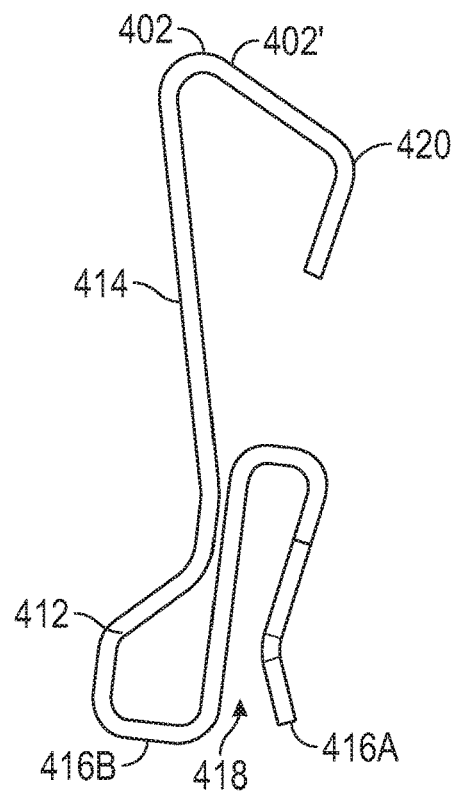
FIG. 4D is a side elevation view of the spring clip of FIGS. 4A and 4C.

Referring to FIGS. 4C and 4D, the engagement feature 402 is embodied as a spring clip 402' although other types of engagement features may be used. In particular the spring clip 402' includes a body 412 and an arm 414 extending upward from the body 412. The arm 414 is forwardly biased and integrally attached to the body 412. The body 412 includes a front leg 416A, and a back leg 416B with a gap 418 defined therebetween.

Referring to FIG. 4A, the front leg 416A is positioned within the top attachment slot 408 of the mount 400, wherein the back surface 410 is positioned within the gap 418 of the spring clip 402'. The front leg 416A and the back leg 416B are inwardly biased towards themselves to frictionally engage the mount 400, such that the back leg 416B contacts and frictionally engages the back surface 410 of the mount 400.

Referring to FIGS. 4C and 4D, the arm 414 of the spring clip 402' extends upwardly from the body 412, with an engagement portion 420 at an upper end of the arm 414. In particular, the engagement portion 420 is a forwardly extending recurved shape to contact a medially extending tab member 212A, 212B of the hood assembly 102.

Figure 5A:
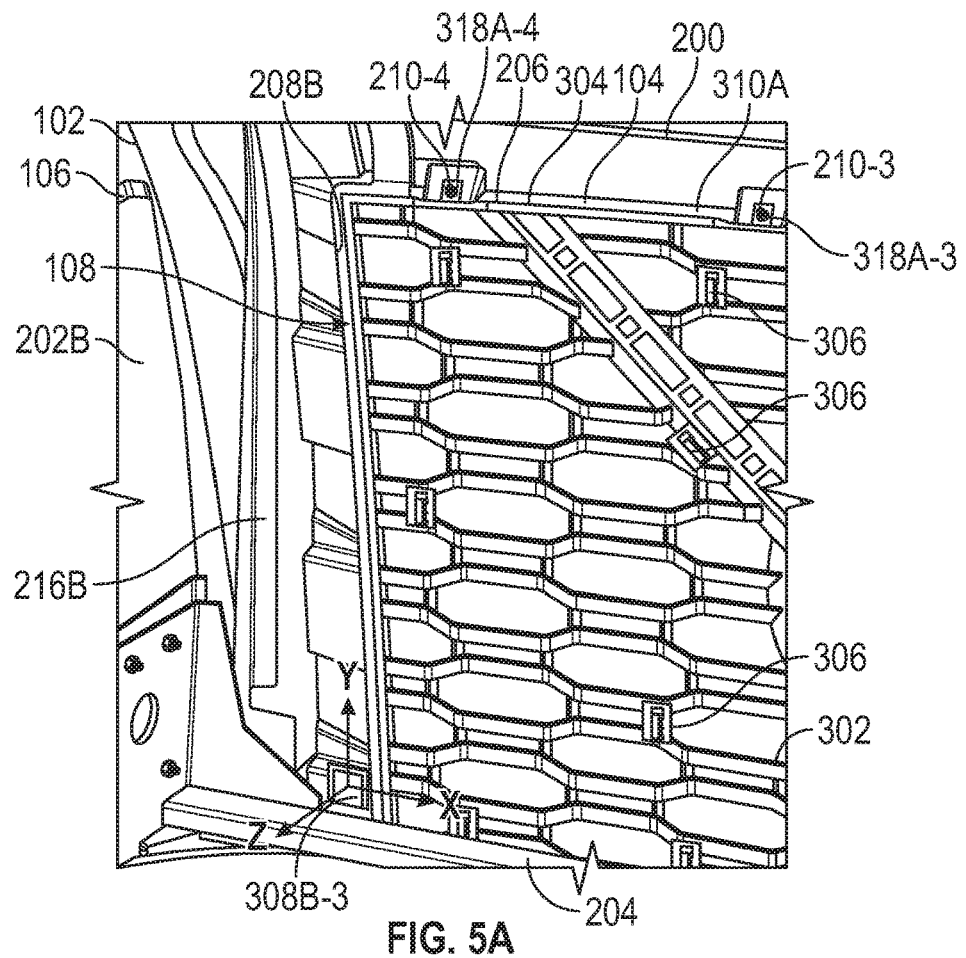
FIG. 5A is a rear perspective view of a portion of the front grille of FIGS. 1A and 1B mounted to the hood assembly of FIGS. 2A-2D.
Figure 5B:
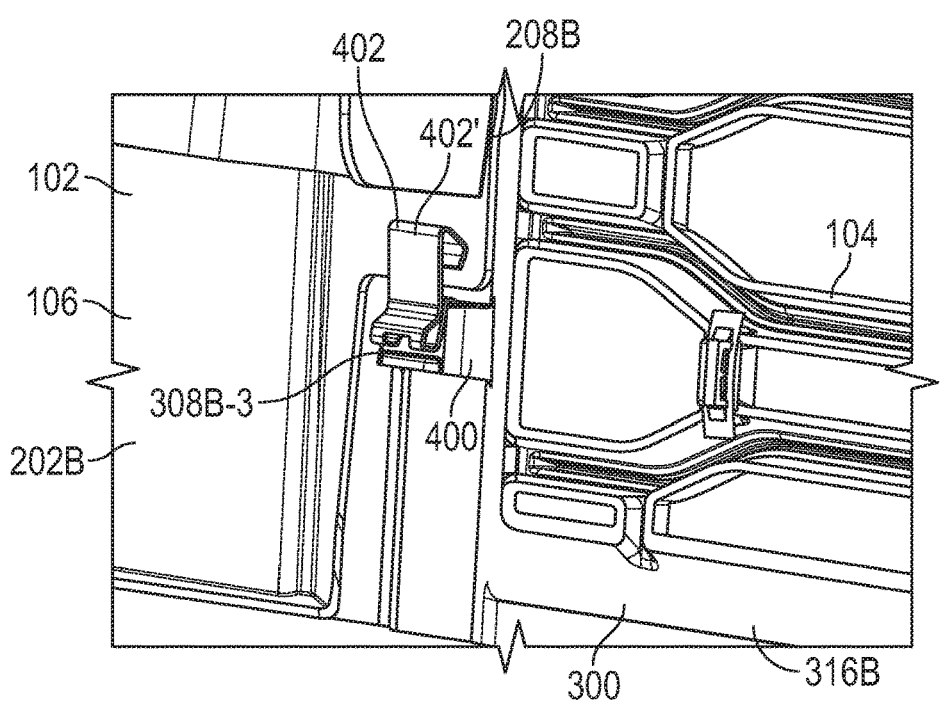
FIG. 5B is a magnified rear perspective view of FIG. 5A illustrating a fastener of the front grille engaged with the hood assembly.
Figure 5C:
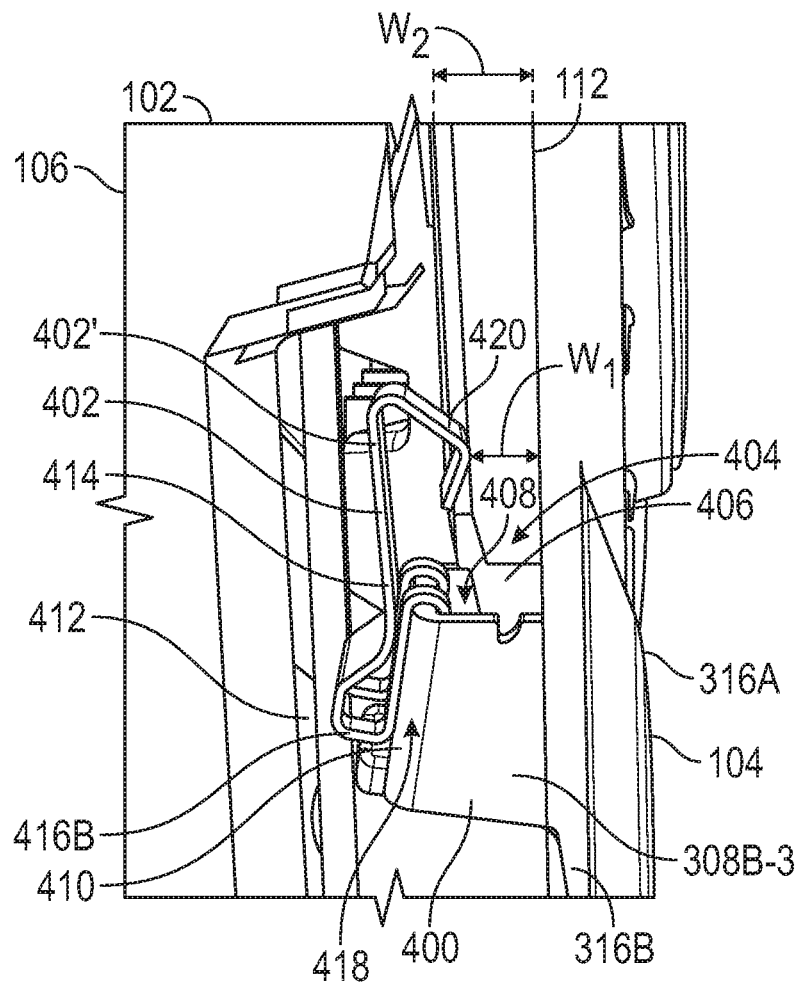
FIG. 5C is a side perspective view of the fastener of FIG. 5B.

FIGS. 5A-5C illustrate the front grille 104 mounted to the hood assembly 102. Referring to FIG. 5A, the front grille 104 covers the front aperture 108 of the hood assembly 102. The upper attachment holes 318A of the top member 310A of the front grille 104 are registered with the upper attachment holes 210 of the hood portion 200 of the hood assembly 102, and are rigidly attached to one another by fasteners (e.g., screws). The lower attachment holes 318B of the bottom member 310B (see FIGS. 3A-3B) of the front grille 104 are registered with the lower attachment holes 220A, 220B of the lateral support 204 of the hood assembly 102 (shown in FIGS. 6A and 6B), and are non-rigidly attached to one another by the left and right isolators 222A, 222B (with the left and right isolators 222A, 222B positioned within the lower attachment holes 220A, 220B) (see FIG. 2B). Thus, the left and right isolators 222A, 222B (see FIGS. 3A-3B) allow for some movement (e.g., lateral movement) of the bottom member 310B (see FIGS. 3A-3B) of the front grille 104 relative to the lateral support 204 of the hood assembly 102.

The right fasteners 308B of the front grille 104 are attached to the right medially extending tab members 212B (see FIGS. 2A-2C) of the right fender portion 202B of the hood assembly 102; however, only the third right fastener 308B-3 is shown, with first and second right fasteners 308B-1, 308B-2 covered by the right stiffening member 216B. Similarly, although not shown, the left fasteners 308A of the front grille 104 are attached to the left medially extending tab members 212A (see FIGS. 2A-2C) of the left fender portion 202A of the hood assembly 102 (see FIGS. 1A-3B).

Referring to FIGS. 5B and 5C, attachment of fastener 308B-3 is shown, although the description thereof applies to all of the fasteners 308. In particular, when mounting, the third right fastener 308B-3 of the front grille 104 is inserted through the third right insertion gap 214B-3 (see FIGS. 2A-2C) such that the spring clip 402' translates past a back surface of the third right medially extending tab member 212B-3 (see FIGS. 2A-2C). Once inserted, the front grille 104 is moved (e.g., translated) upward relative to the hood assembly 102. The width W1 of the engagement slot 404 defined between the back surface 316B of the peripheral frame 300 and the engagement portion 420 of the spring clip 402' is smaller than the width W2 between the front surface 112 of the hood assembly 102 and the back surface of the third right medially extending tab member 212B-3 (including the width of the rearwardly protruding segment 224 (see FIG. 2D)). Thus, as the front grille 104 is moved upward relative to the hood assembly 102, the engagement portion 420 contacts the bottom edge (e.g., rearwardly protruding segment 224) of the third right medially extending tab member 212B-3, thereby forcing the arm 414 of the spring clip 402' to outwardly pivot as the engagement portion 420 of the spring clip 402' translates past a bottom edge (e.g., the rearwardly protruding segment 224) of the third right medially extending tab member 212B-3.

Once the front grille 104 is mounted to the hood assembly 102, the fasteners 308 (and in particular the spring clip 402' thereof) provide tension along the left and right members 312A, 312B (see FIGS. 3A-3B) of the peripheral frame 300 of the front grille 104 by engagement of the spring clip 402' with the left and right medially extending tab members 212A, 212B. Further, the rearwardly protruding segment 224 prevents the spring clip 402' from slipping downward and accidentally disengaging the spring clip 402' with the left and right medial extending tab members 212A, 212B. However, the spring clip 402' of the fasteners 308 are non-rigidly and frictionally attached to the left and right medially extending tab members 212A, 212B, thereby allowing movement of the engagement portion 420 of the spring clip 402' along a back surface of the left and right medially extending tab members 212A, 212B. Thus, the left and right members 312A, 312B of the peripheral frame 300 of the front grille 104 are held in tension with the left and right fender portions 202A, 202B but some movement is allowed therebetween to alleviate stress on the front grille 104 and reduce risk of damage from any deflection or deformation of the hood assembly 102 (e.g., during rough driving).

Figure 6A:
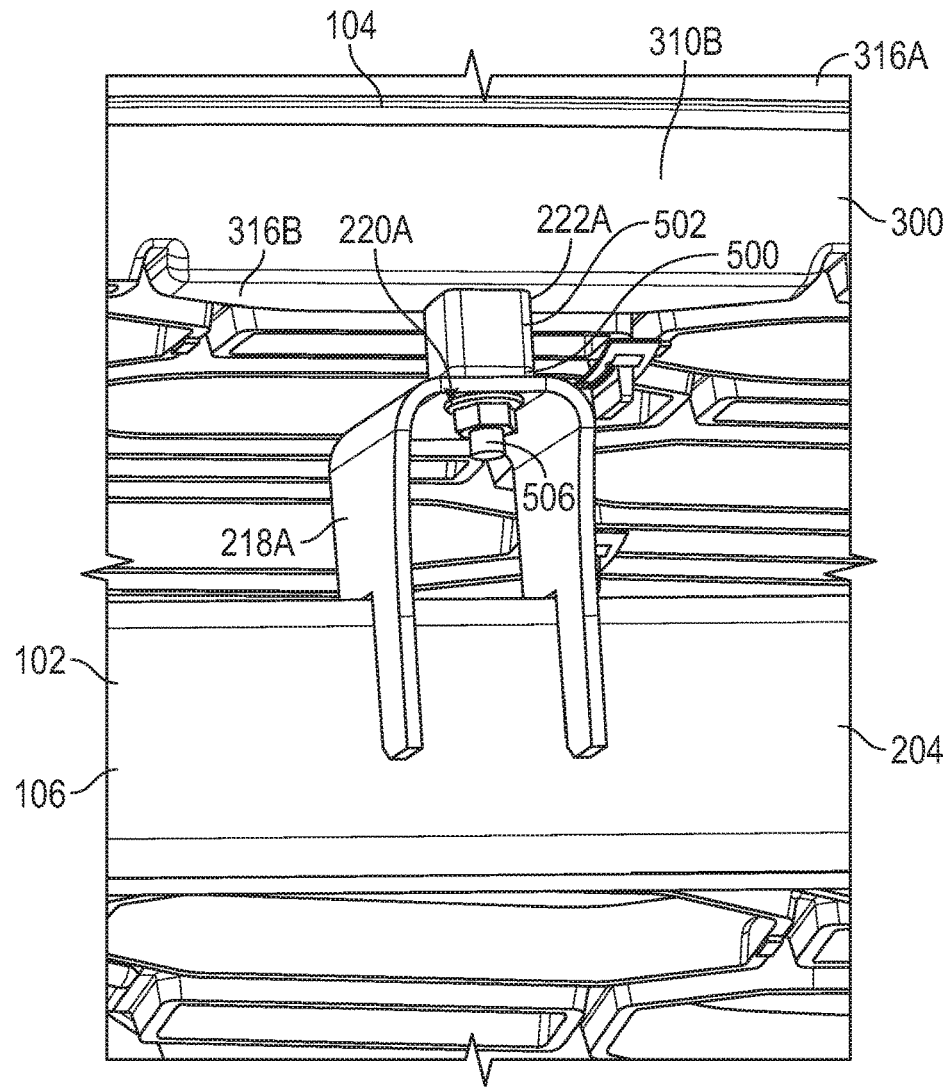
FIG. 6A is a lower perspective view of the front grille and fastener of FIGS. 5A-5C illustrating attachment of a bottom member of the front grille to the hood assembly by an isolator.
Figure 6B:
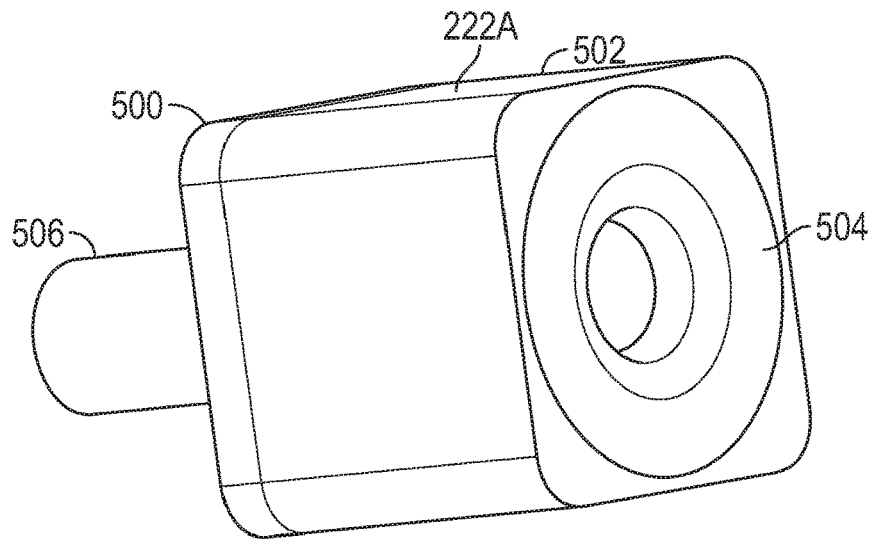
FIG. 6B is a perspective view of the isolator of FIG. 6A.

FIGS. 6A and 6B illustrate the left isolator 222A and attachment of the bottom member 310B of the front grille 104 to the hood assembly 102 by the left isolator 222A. Left isolator 222A is discussed, but right isolator 222B includes the same features. Left isolator 222A includes a base 500, an isolation body 502 attached to the base 500, and a threaded insert 504 embedded within the isolation body 502. The base 500 may be made of metal and may include a rod 506 (e.g., threaded rod) inserted through the lower attachment hole 220A of the left mounting bracket 218A of the lateral support 204 to attach the isolator 222A to the lateral support 204 (e.g., by a nut). Threaded insert 504 is registered with the first lower attachment hole 318B-1 of the bottom member 310B (see FIGS. 3A-3B) of the peripheral frame 300 of the front grille 104 and a fastener (not shown) is inserted through the lower attachment hole 318B-1 into the threaded insert 504 to attach the front grille 104 to the isolator 222A. Thus, left isolators 222A attach the bottom member 310B of the front grille 104 to the lateral support 204 of the hood assembly 102. The isolation body 502 is made of an elastic material (e.g., rubber), thereby allowing some movement between the bottom member 310B of the front grille 104 and the lateral support 204 of the hood assembly 102 and dampening vibrations therebetween. As similarly discussed above, this relative movement alleviates stress on the front grille 104 and reduces risk of damage from any deflection or deformation of the hood assembly 102 (e.g., during rough driving).

While the invention has been described herein in reference to specific aspects, features, and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications and alternative embodiments, within its scope and including equivalents of the claims.

What is claimed is:

1. A front grille for a motor vehicle, the front grille comprising:
    a peripheral frame including left and right members, and defining a central opening; and
    a first plurality of fasteners extending rearward from the left member, and a second plurality of fasteners extending rearward from the right member, wherein the first plurality of fasteners and the second plurality of fasteners are configured for sliding engagement with a hood assembly of the motor vehicle;
    wherein each fastener of the first plurality of fasteners comprises a left mount extending rearward from the left member and a left engagement feature attached to and extending upward from a rear wall of the left mount; and
    wherein each fastener of the second plurality of fasteners comprises a right mount extending rearward from the right member and a right engagement feature attached to and extending upward from a rear wall of the right mount.

2. The front grille of claim 1, further comprising a grating disposed in the central opening extending between the left and right members of the peripheral frame.

3. The front grille of claim 1, wherein the peripheral frame further comprises a top member and a bottom member each extending between the left and right members, wherein the left, right, top, and bottom members form a generally rectangular shape.

4. The front grille of claim 3, further comprising a plurality of upper attachment holes defined in the top member and a plurality of lower attachment holes defined in the bottom member.

5. The front grille of claim 1, wherein:
    each fastener of the first plurality of fasteners comprises a left slot defined between the left member and the left engagement feature;
    each fastener of the second plurality of fasteners comprises a right slot defined between the right member and the right engagement feature; and
    each left slot and each right slot is configured to slidably receive a portion of the hood assembly of the motor vehicle therein.

6. The front grille of claim 5, wherein each left engagement feature and each right engagement feature comprises a spring clip configured to exert a biasing force on a portion of the hood assembly that serves to reduce forward-rearward separation between the front grille and the hood assembly of the motor vehicle.

7. The front grille of claim 6, wherein the spring clip comprises a recurved shape that defines a forwardly extending engagement portion configured to contact the hood assembly of the motor vehicle.

8. The front grille of claim 6, wherein each of the left mount and the right mount includes a top surface defining an opening configured to receive at least a portion of the spring clip to promote attachment of the spring clip to the respective mount.

9. A hood assembly for a motor vehicle, the hood assembly comprising:
at least one structural member defining a front aperture bounded by left and right sides;
a plurality of first medially extending tab members and a plurality of first insertion gaps each arranged proximate to the left side of the front aperture, wherein each first medially extending tab member of the plurality of first medially extending tab members is separated from each other first medially extending tab member by at least one first insertion gap of the plurality of first insertion gaps; and
a plurality of second medially extending tab members and a plurality of second insertion gaps each arranged proximate to the right side of the front aperture, wherein each second medially extending tab member of the plurality of second medially extending tab members is separated from each other second medially extending tab member by at least one second insertion gap of the plurality of second insertion gaps;
wherein each insertion gap of the plurality of first insertion gaps and the plurality of second insertion gaps is configured to receive a fastener extending rearwardly from a front grille during a grille mounting operation, with the front grille being arranged to cover the front aperture; and
wherein each medially extending tab member of the plurality of first medially extending tab members and the plurality of second medially extending tab members is configured to slidably engage the fastener extending rearwardly from the front grille.

10. The hood assembly of claim 9, wherein the front aperture is further bounded by an upper side defined by the at least one structural member.

11. The hood assembly of claim 10, further comprising a plurality of upper attachment holes defined in the at least one structural member along the upper side to receive upper fasteners for mounting the front grille to the hood assembly.

12. The hood assembly of claim 9, wherein the at least one structural member further comprises a lower opening extending between a bottom of the left side of the front aperture and a bottom of the right side of the front aperture.

13. The hood assembly of claim 12, further comprising a lateral support that is rearwardly offset relative to a front surface of the at least one structural member, wherein the lateral support is arranged behind the lower opening.

14. The hood assembly of claim 13, wherein the lateral support comprises a plurality of mounting brackets configured to receive lower fasteners for mounting the front grille to the hood assembly.

15. The hood assembly of claim 9, wherein the at least one structural member comprises a unitary structural member encompassing a left fender portion, a right fender portion, and a hood portion extending between and generally above the left fender portion and the right fender portion.

16. The hood assembly of claim 15, wherein the front aperture extends between the left fender portion and the right fender portion, and extends below the hood portion.

17. The hood assembly of claim 9, wherein each medially extending tab member of the pluralities of first and second medially extending tab members comprises a rearwardly protruding segment arranged proximate to a bottom edge of the medially extending tab member to promote retention of the fastener of the front grille.

18. A method for mounting a front grille to a motor vehicle hood assembly including at least one structural member defining a front aperture bounded by left and right sides, the method comprising:
inserting a first plurality of fasteners extending rearward from a left member of a peripheral frame of the front grille with a plurality of first insertion gaps arranged proximate to the left side of the front aperture, and inserting a second plurality of fasteners extending rearward from a right member of the peripheral frame of the front grille with a plurality of second insertion gaps arranged proximate to the right side of the front aperture; and
sliding the front grille upward relative to the motor vehicle hood assembly to position the front grille to cover the front aperture, to cause the first plurality of fasteners to engage a first plurality of medially extending tab members arranged proximate to the left side of the front aperture, and to cause the second plurality of fasteners to engage a second plurality of medially extending tab members arranged proximate to the right side of the front aperture.

19. The method of 18, further comprising:
fastening a top member of the front grille to the at least one structural member proximate to an upper edge bounding the front aperture.

20. The method of 18, further comprising:
fastening a bottom member of the front grille to a lateral support associated with the at least one structural member, wherein the lateral support is rearwardly offset relative to a front surface of the at least one structural member.

21. A front grille for a motor vehicle, the front grille comprising:
a peripheral frame including left and right members, and a top member and a bottom member each extending between the left and right members, wherein the left, right, top, and bottom members form a generally rectangular shape, and the peripheral frame defines a central opening; and
a first plurality of fasteners extending rearward from the left member, and a second plurality of fasteners extending rearward from the right member, wherein the first plurality of fasteners and the second plurality of fasteners are configured for sliding engagement with a hood assembly of the motor vehicle; and
wherein the top member defines a plurality of upper attachment holes, and the bottom member defines a plurality of lower attachment holes.

* * * * *